United States Patent [19]

Ostrander

[11] 4,274,298
[45] Jun. 23, 1981

[54] DRIVE UNIT SEAL ASSEMBLY

[76] Inventor: Robert J. Ostrander, 7132 Putt La., Fort Wayne, Ind. 46815

[21] Appl. No.: 55,420

[22] Filed: Jul. 6, 1979

[51] Int. Cl.³ .................... F16H 57/04; F01M 9/10
[52] U.S. Cl. .................... 74/467; 184/6.12; 277/29; 277/92; 277/136
[58] Field of Search .......... 74/467, 468; 277/29, 277/92, 136, 152, 216; 184/1.5, 6 R, 6.12, 11 R, 11 A

[56] References Cited

U.S. PATENT DOCUMENTS

| | | | |
|---|---|---|---|
| 2,015,108 | 9/1935 | Harper | 74/467 |
| 2,029,072 | 1/1936 | Hughes | 308/187 |
| 2,231,947 | 2/1941 | Rich | 286/11 |
| 2,981,373 | 4/1961 | VanRanst | 74/467 |
| 3,255,839 | 6/1966 | Goldman | 277/136 |
| 3,285,614 | 11/1966 | McClenathan | 277/136 |
| 3,375,729 | 4/1968 | Brown et al. | 74/467 |
| 3,383,937 | 5/1968 | Toenne et al. | 74/467 |
| 3,408,095 | 10/1968 | Moore | 277/152 |
| 3,813,104 | 5/1974 | Smith | 277/94 |
| 3,829,104 | 8/1974 | Green | 277/29 |
| 4,123,068 | 10/1978 | VanGorder | 277/29 |
| 4,134,596 | 1/1979 | Kawai et al. | 277/152 |
| 4,157,045 | 6/1979 | Suzuki | 184/6.12 |

FOREIGN PATENT DOCUMENTS 1650024  8/1970  Fed. Rep. of Germany ............ 277/92

Primary Examiner—Lawrence J. Staab
Attorney, Agent, or Firm—Robert M. Leonardi

[57] ABSTRACT

An axle is disclosed having a housing defining a lubricant reservoir. A shaft extends through a bore in the housing and is supported by two bearings within the bore. The shaft has a radially extending surface which partially defines a lubricant chamber for pressurizing and pumping lubricant. The housing has a lubricant passageway in communication with the lubricant chamber. A seal is positioned within the lubricant chamber and has a lip which contacts the radial surface.

2 Claims, 3 Drawing Figures

DRIVE UNIT SEAL ASSEMBLY

BACKGROUND OF THE INVENTION

This invention relates generally to lubrication systems for drive units and more particularly to seals used with such systems.

Many types of drive units for transmitting power are well known and are widely used in industrial applications, such as in power take-off units, and in vehicular applications, such as in axles. Lubricant flow over the drive unit components lubricates and helps dissipate heat. For example, lubricant flowing rapidly across the bearings and gears of an axle can absorb heat therefrom and transfer it to the housing, which often has fins or other heat dissipating devices rendering it more capable of such heat dissipation.

With the ever increasing size of drive units used in industrial and vehicular applications, as for example heavy duty truck axles, lubricant circulation becomes increasingly difficult. Increasing speed and load carrying requirements of modern vehicular and industrial drive units have increased the stresses to which these drive units are exposed and have magnified the lubrication problems.

At least one lubricant circulation system, that disclosed in U.S. patent application No. 831,588, assigned to Dana Corporation, the disclosure of which is incorporated herein by reference, has significantly advanced the state of the art by providing a pressurized system for forcing lubricant to critical drive unit components. Unfortunately, previously known seals have not been entirely satisfactory in such a pressurized system.

SUMMARY OF THE INVENTION

The present invention is a drive unit comprising a housing having a bore through which extends a rotatable shaft. The shaft has a generally radially extending surface which may be provided by a baffle affixed to the shaft. An annular lubricant chamber is partially defined by the bore and the radial surface. A seal is positioned within the lubricant chamber in contact with the bore. The seal has an annular lip in contact with the radial surface.

DETAILED DESCRIPTION OF A PRESENTLY PREFERRED EMBODIMENT

Figure 1:
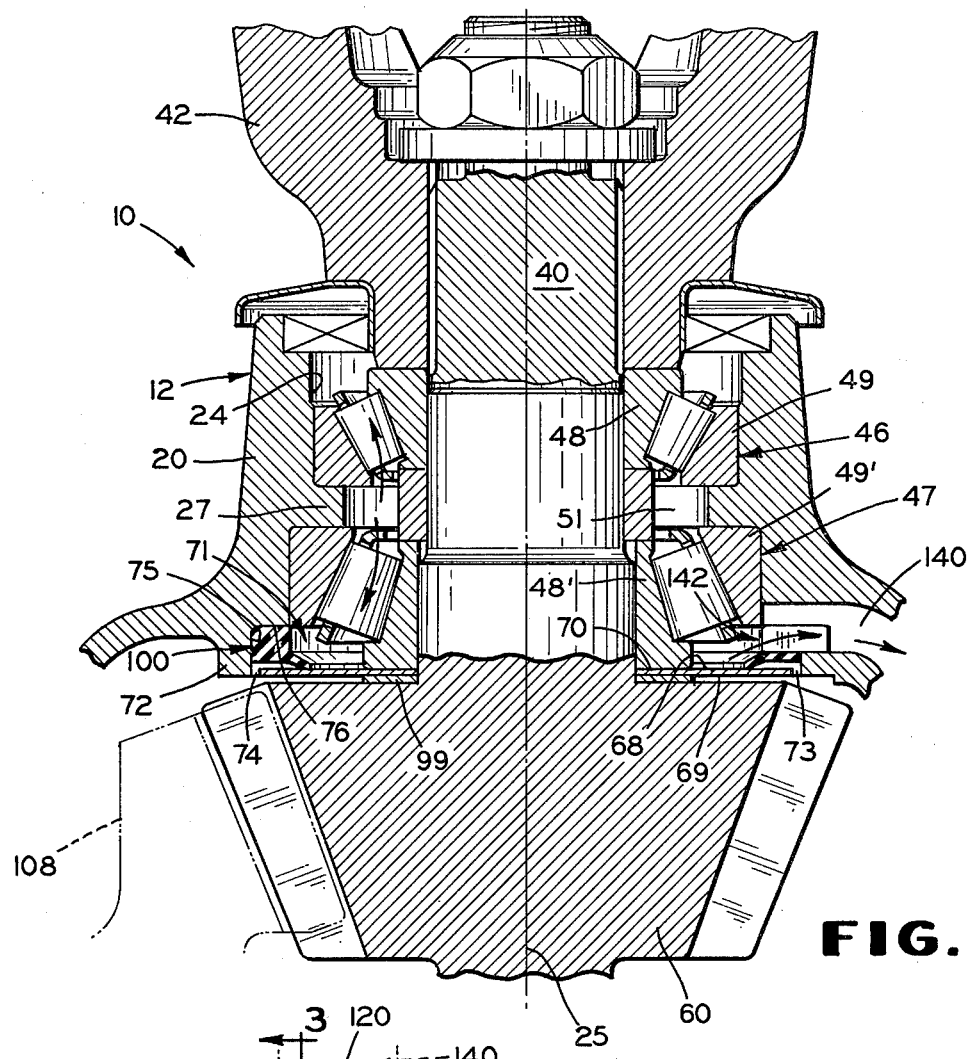
FIG. 1 is a cross sectional view of a drive unit utilizing a lubricant recirculation system and the seal of the present invention.

FIG. 1 shows the input portion of a drive unit 10 such as a heavy duty truck axle. The drive unit 10 comprises a housing 12 which defines a lubricant reservoir (not shown).

The housing 12 includes a boss 20 through which extends a stepped bore 24 defining an input opening and having an axis 24. The bore 24 defines an annular ridge 27 for supporting bearing assemblies as will hereinafter be described. The bore 24 further comprises an annular and generally axially extending ridge 72, an annular axially extending surface 75 and an annular radially extending surface 76. The surfaces 75 and 76 partially define a lubrication chamber as will hereinafter be described.

An input shaft 40, having a yolk 42 and a generally longitudinal axis 25 about which it is rotatable, extends through the input opening into the bore 24. The input shaft 40 includes an axially inner portion to which a drive pinion gear 60 is affixed. A ring gear 108 meshes with the pinion gear 60 to drive the axle as is well known in the art.

Inner and outer pinion bearing assemblies 47 and 46, respectively, are positioned within the bore 24 on opposite sides of the ridge 27 for rotatably supporting the input shaft 40. A lubricant collection area 51 exists between the bearing assemblies 46 and 47. The pinion bearing assemblies 46 and 47 each comprise an inner race 48 and 48', respectively, rotatable with the input shaft 40 and an outer race 49 and 49', respectively, affixed to the surface of the bore 24 and abutting the ridge 27. The bearing assemblies 46 and 47 each include a plurality of circumferentially spaced tapered roller bearings, each bearing being tapered toward the other bearing assembly (i.e., the smallest diameter portion of each bearing is exposed to the collection area 51 between the bearing assemblies 46 and 47). The outer pinion bearing assembly 46 is secured within the bore 24 by the yolk 42 which abuts and rotates with the inner race 48. The inner bearing assembly 47 ultimately is held in position by the drive pinion gear 60. The axially innermost portion of the input shaft is rotatably secured within the housing 12 by a nose bearing assembly (not shown).

An annular metal baffle 70 is affixed to the axially inner portion of the rotatable input shaft 40. The baffle 70 has an inside diameter approximately equal to the diameter of the input shaft 40. The baffle 70 is generally flat, having two parallel and radially extending faces 68 and 69 and an annular radially outer surface 74. An annular spacer 99 is positioned between the baffle 70 and the pinion gear 60 to provide proper alignment between the pinion gear teeth and the ring gear teeth. Alternatively, the baffle 70 may axially abut the drive pinion gear 60 and act as a pinion gear spacer for positioning the pinion gear relative to the ring gear. The thickness of the baffle may then be varied as required.

Alternatively, the baffle may be an integral part of the input shaft 40 or the pinion gear 60. In this specification, including the appended claims, the baffle 70 and the pinion gear 60 may be considered a part of the shaft 40. Therefore, the radially extending surface 68 may be considered as a surface of the shaft 40.

The outside diameter of the baffle 70 is smaller than the inside diameter of the ridge 72 to prevent the annular baffle surface 74 from rubbing against the radially inner annular ridge surface 75. An annular gap 73 between the baffle 70 and the ridge 72 is provided because of the manufacturing tolerances required to press fit the baffle 70 over the inner portion 41 of the input shaft 40. In the presently preferred embodiment, the gap 73 has a maximum width of about 0.125 inches (3.175 mm.).

An annular lubricant pressurization and pump chamber 72 is formed between the ridge 72, the flat, radially extending surface 68 of the baffle 70 and the inner pinion bearing assembly 47. A lubricant passageway 140 integrally formed within the housing 12 extends generally from an axially inward position of the bore 24 to the differential and planetary gears of the axle (not shown). The passageway 140 has a generally rectangular cross section with an average depth of about 0.5 inches (1.27 cm.), as seen in FIG. 1, and an average width of about 1.25 inches (3.175 cm.). The passageway 140 includes an inlet 142 axially positioned between the baffle 70 and the inner roller bearing assembly 47 and an outlet (not shown) adjacent the axle gears.

The axle housing is provided with a lubricant return path (not shown) leading from the lubricant reservoir to the lubricant collection area 51 between the bearing assemblies 46 and 47. The tapered roller bearing assemblies 46 and 47 pump lubricant entering the collection area 51 in the direction of the arrows. While a typical heavy duty axle is adapted for operation in the range of 2800 to 3200 r.p.m., the tapered roller bearings 50 rotate at a much higher speed, for example about 10,000 r.p.m., thereby creating significant pumping forces.

The inner pinion bearing assembly 47 pulls lubricant from the collection area 51 and directs it into the annular pump chamber 71 and against the flat annular baffle 70 which rotates with the input shaft 40 and pinion gear 60. The baffle 70 rapidly circulates lubricant within the chamber 71, producing a fluid pressure head therein.

The chamber 71 opens to inlet passageway 142 which can also be considered as the lubrication chamber outlet. The centrifugal forces and the fluid pressure head created by the baffle force lubricant out of the chamber 71 and into the passageway 140. The fluid pressure head is maintained within the lubricant passageway 140 because of its relatively small cross sectional area. Lubricant is therefore forced through the passageway 140 to the outlet and into the axle gears.

As previously noted, the outer surface 74 of the baffle 70 rotates adjacent the surface 75 to prevent excessive lubricant leakage through the gap 73. However, in some applications, the gap may cause excessive leakage of lubricant, thereby decreasing the lubricant pressure head within the pump chamber 71 and the pumping capabilities of baffle 70.

An integrally molded elastomeric seal 100 is positioned within the lubricant chamber 71. The seal may be molded from any common seal elastomer, such as nitrile. Positioning the seal 100 within the lubricant chamber provides the significant advantage that the pinion gear 60 and shaft 40 can be removed from the bore 24 without removing the seal, unlike seals which are located outside of the lubricant chamber.

Figure 2:
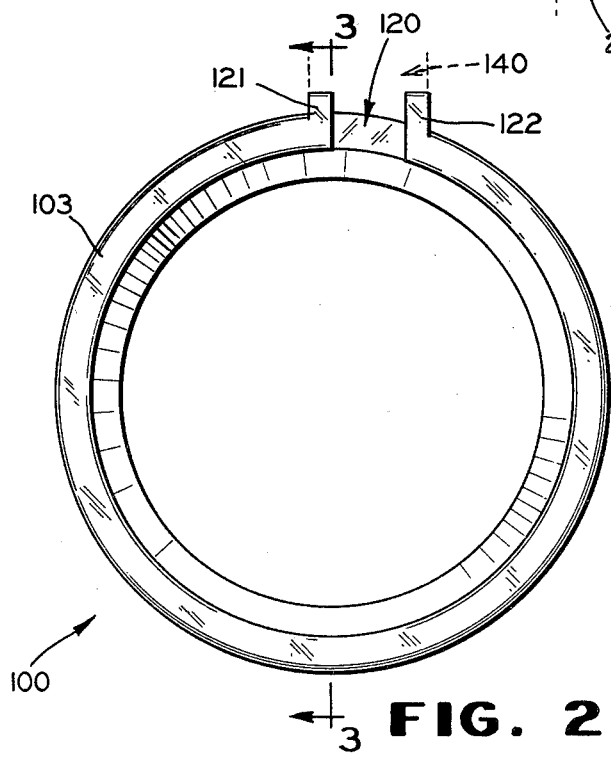
FIG. 2 is a plan view of the seal shown in FIG. 1.
Figure 3:
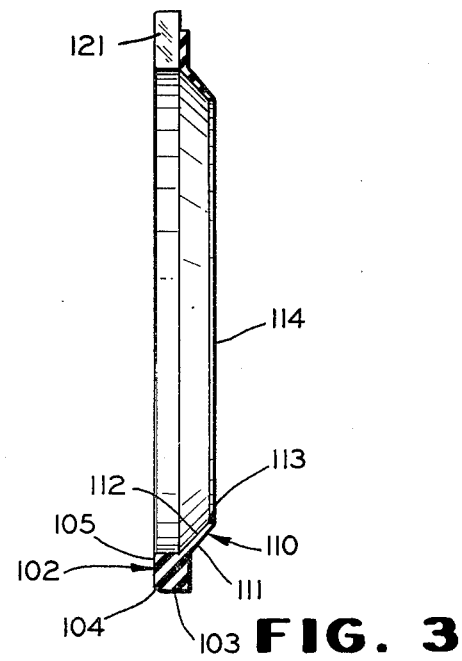
FIG. 3 is a cross sectional view of the seal of FIG. 2 taken along line 3—3.

Referring to FIGS. 2 and 3, the seal 100 includes an annular outer rib 102 which abuts the bore 24. The rib 102 has an annular outer axially extending surface 103 which abuts bore surface 75 and an annular radially extending surface 105 which abuts the bore surface 76. The rib has a rounded edge 104 which conforms to the radius between the bore surfaces 75 and 76.

A frustoconical elastomeric lip 110 extends from a corner of the rib 102. The lip has an inner surface 112, an outer surface 111 and an annular axially extending surface 113 joining surfaces 112 and 111. A sealing edge 114 is formed between surfaces 111 and 113. The sealing edge 114 is in sliding and sealing contact with the radially extending surface 68. The lip 110 is relatively thin and sufficiently flexible to allow the use of spacers or shims such as 99, which are required for proper gear positioning as previously mentioned, without affecting the seal performance.

The seal 100 has generally radial protuberances or tangs 121 and 122 which extend from the lubricant chamber 71 into the lubricant passageway 140 (shown in phantom in FIG. 2). These tangs, along with the frictional contact between the rib 102 and the bore 24, prevent rotation of the seal within the chamber 71. Additional tangs may be added around the seal's circumference in some applications where there are large seal drag forces. The seal rib 102 is partially interrupted by an opening or channel 120 which allows communication between the lubricant chamber 71 and the lubricant passageway 140.

In summary, lubricant entering the chamber 71 is rapidly circulated by the baffle 70, thereby creating a pressure head. Lubricant pressure in the chamber 71 acts against seal lip surface 112, thereby forcing the lip against the baffle, preventing lubricant from escaping the lubricant chamber through the gap 73. Centrifugal force urges the lubricant radially outwardly toward the bore 24. The seal lip 110 deflects lubricant away from the baffle to a location where it can readily pass into the lubrication passageway 140.

Although the foregoing structure has been described for the purpose of illustrating a presently preferred embodiment of the invention, it should be understood that many modifications or alterations may be made without departing from the spirit and scope of the invention as set forth in the appended claims.

What is claimed is:

1. A drive assembly comprising
   a housing defining a bore;
   a shaft extending through said bore and rotatable relative to said housing, said shaft having a generally radially extending surface adjacent said bore;
   an annular lubricant chamber at least partially defined by said bore and said surface, said lubricant chamber having an outlet; and
   a seal within said lubricant chamber, said seal comprising means for providing a seal between said bore and said surface, said seal further comprising a protuberance extending into said outlet for preventing rotation of said seal with respect to said housing.

2. A drive assembly as defined in claim 1 wherein said means for providing a seal comprises an annular rib, said rib having an outer surface in contact with said bore, and an annular lip extending from said rib, said lip in contact with said surface, wherein said rib defines an opening aligned with said outlet.

* * * * *